United States Patent [19]

Ernst

[11] 4,120,363

[45] Oct. 17, 1978

[54] ROOT CROP HARVESTER

[75] Inventor: Arnold E. Ernst, Wolverton, Minn. 56594

[73] Assignee: Arnold E. Ernst, Wolverton, Minn.

[21] Appl. No.: 744,967

[22] Filed: Nov. 26, 1976

[51] Int. Cl.² .............................................. A01D 19/02
[52] U.S. Cl. ..................... 171/58; 209/669; 209/673
[58] Field of Search ................. 171/58; 198/670, 662, 198/663; 209/106, 107

[56] References Cited

U.S. PATENT DOCUMENTS

| 3,283,895 | 11/1966 | Rollins | 209/107 |
| 3,809,164 | 5/1964 | Hook | 171/58 |
| 4,024,920 | 5/1977 | Haverdink | 171/58 |

Primary Examiner—Russell R. Kinsey
Attorney, Agent, or Firm—Henderson, Strom, Sturm, Cepican & Fix

[57] ABSTRACT

A cleaning conveyor is illustrated as part of a beet harvester and includes a plurality of transversely extending elongated rollers which move the beets laterally to feed into a vertical auger conveyor. At the vertical auger end, the forwardmost and rearwardmost cleaning rollers are yieldably mounted and the cleaning conveyor is positioned relative to the vertical auger conveyor so that the flow of beets into the vertical auger conveyor is unobstructed by dirt and mud buildup above the cleaning rollers or by the repelling force of the rotating vertical auger.

3 Claims, 5 Drawing Figures

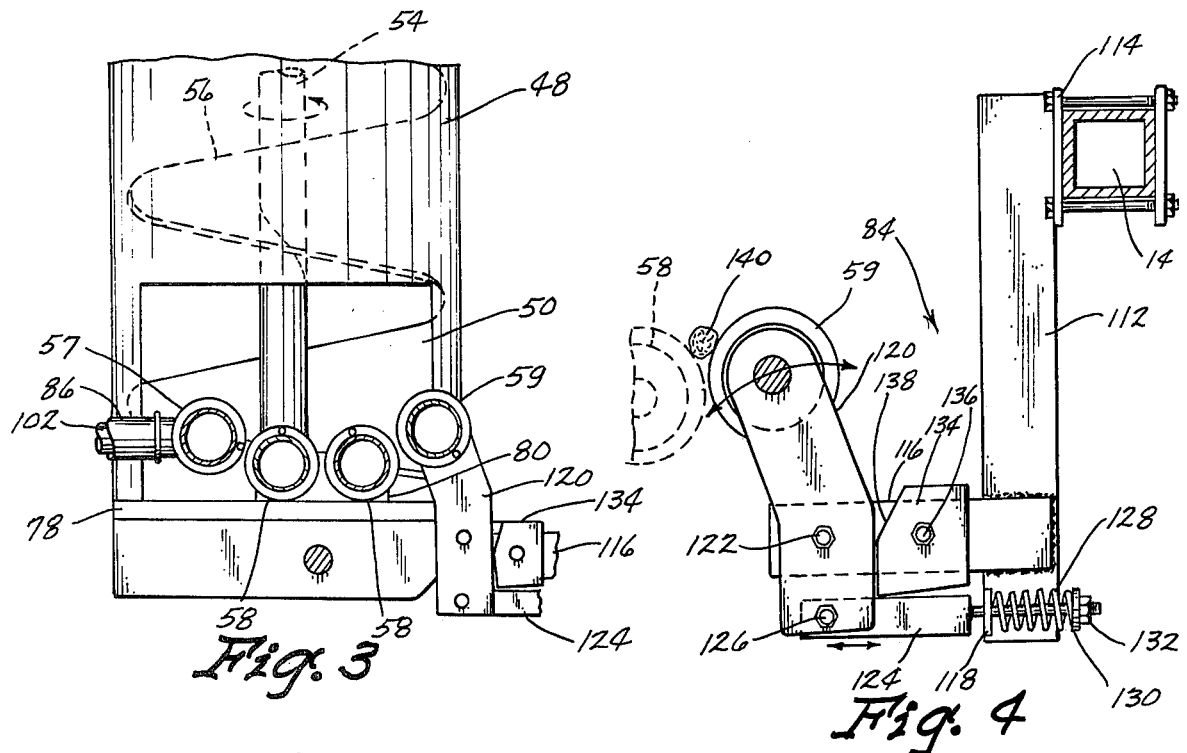
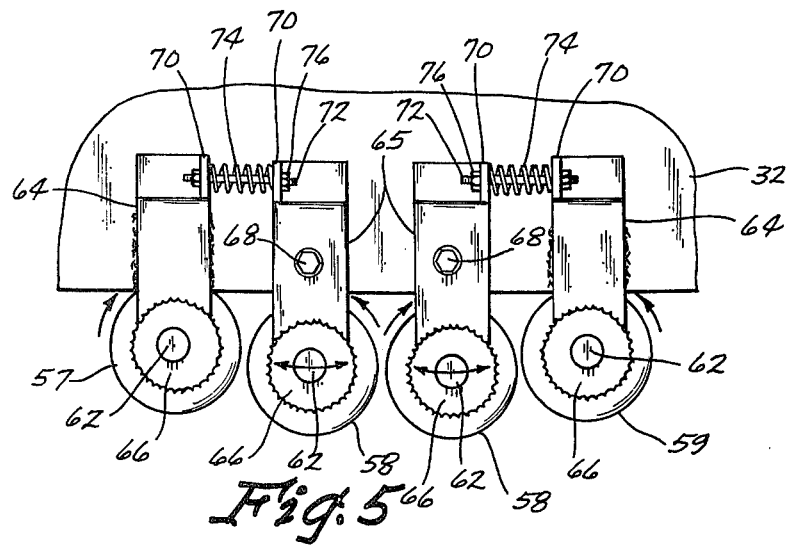

ROOT CROP HARVESTER

BACKGROUND OF THE INVENTION

1. Field of the Invention.

The present invention relates generally to root crop harvesters and more particularly to harvesters utilizing cleaning conveyors of the type having counter-rotating driven rollers disposed adjacent to one another where such rollers employ yieldable mounting means.

2. Description of the Prior Art

In the harvesting of beets or other root crops, the harvesting machine conventionally digs up the beets and deposits them on a conveyor which moves the beets rearwardly and upwardly for deposit on a cleaning conveyor. The cleaning conveyor moves the beets laterally to a vertical auger conveyor which moves the beets upwardly for deposit on yet another conveyor which moves the beets to a deposit area.

The beets have clods of dirt or mud adhering thereto when they are first deposited on the cleaning conveyor. In order to process the beets more efficiently, it is first necessary to separate them from the major portion of the adhering clods. This operation is accomplished on the cleaning conveyor which consists of a series of adjacent counter-rotating rollers which roll the beets and remove the clods from their sides by friction or by impact while conveying them axially of the rollers. Movement of the beets along the cleaning conveyor is accomplished by helical ridges which push the beets lengthwise of the rollers toward the vertical auger as the rollers rotate. In the process, the clods fall through the spaces between the rollers, whereas the much larger beets remain on top of the rollers.

Since rocks occasionally reach the cleaning conveyor surface, it is desirable to make the rollers resiliently separable to a limited degree to prevent jamming of the machanism by rocks which are too small to be conveyed, and yet too large to fall through the spaces between the rollers. Yieldably mounting the rollers to prevent jamming by rocks creates another problem in that dirt and debris tends to build up on the yieldably mounted structure located under the rollers directly below the spaces between the rollers. The build up problem occurs on the vertical auger conveyor end of the cleaning conveyor since the beets pass over the yieldably mounting structure before entering the lower end of the vertical auger conveyor. Dirt and debris falling through the spaces between the rollers builds up on the yieldably mounted structure located under the rollers; blocks the spaces between the rollers; and builds up above the upper surface of the rollers, thus hindering the flow of beets to the vertical auger conveyor. When this buildup occurs, the operator must stop the harvester, open the vertical auger housing, and manually dislodge the buildup with a bar or the like. Such interruptions naturally decrease the operating efficiency of the harvester.

A further problem occurs in the area of the lower end of the vertical auger conveyor in that the helical flighting of the vertical auger repels the beets as they move from the cleaning conveyor into the vertical auger. This problem has lead to the use of a flapper bar located directly above the opening in the vertical auger conveyor housing. The flapper bar extends transversely of the cleaning conveyor and is drivably rotated to contact the beets and force them into the vertical auger. Use of the flapper bar, however, further complicates the structure and maintenance of the harvester.

SUMMARY OF THE INVENTION

The present invention provides yieldable mounting means for the rollers that are disposed such that the structure of the yieldable mounting means extends forwardly of and rearwardly of the rollers. This arrangement eliminates the buildup of dirt and debris since no portion of the yieldable mounting means is located directly under the spaces between the rollers. The dirt and debris, thus, fall freely through the spaces to the ground.

Further, the cleaning conveyor is disposed such that the longitudinal centerline of the cleaning conveyor is spaced rearwardly of the axis of the vertical auger, relative to the direction of travel of the harvester. This arrangement minimizes the repelling force of the auger flighting and eliminates the need for the flapper bar. Spacing the cleaning conveyor rearwardly of the axis of the vertical auger allows the bulk of the beets to enter the vertical auger at locations where the auger flighting is traveling in the same direction as the incoming beets, thus facilitating their entry into the vertical auger.

An object of the present invention is the provision of a cleaning conveyor which allows efficient, uninterrupted operation of a root crop harvester.

Another object is to provide a cleaning conveyor having yieldable mounting means for the rollers, which is free of dirt and debris buildup between and above the rollers.

A further object of the invention is the provision of a cleaning conveyor having improved movement of root crops into a vertical auger conveyor.

Still another object is to provide an arrangement of a cleaning conveyor and a vertical auger wherein the need for a flapper bar is eliminated.

Other objects, advantages, and novel features of the present invention will become apparent from the following detailed description of the invention when considered in conjunction with the accompanying drawings.

BRIEF DESCRIPTION OF THE DRAWINGS

FIG. 3 is an enlarged vertical sectional view taken along line 3—3 of FIG. 1;

FIG. 4 is a vertical sectional view taken along line 4—4 of FIG. 2; and

FIG. 5 is a fragmentary elevatioanl view taken along line 5—5 of FIG. 2.

DESCRIPTION OF THE PREFERRED EMBODIMENT

Figures 1, 2:
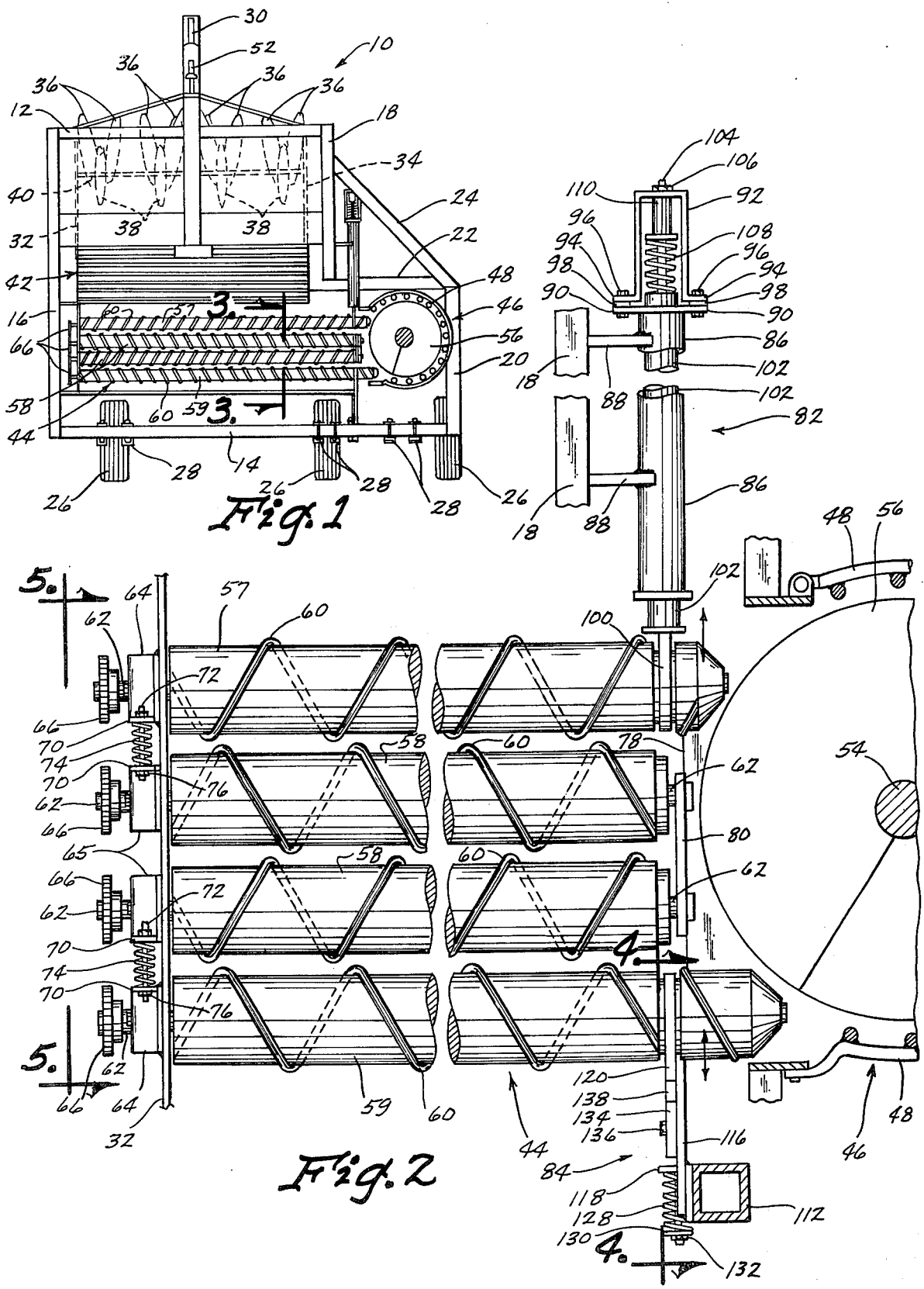
FIG. 1 is a plan view of a root crop harvester employing the present invention.
FIG. 2 is an enlarged plan view of details of the harvester illustrating the present invention, certain parts foreshortened for clarification purposes.

Referring now to FIG. 1, a beet harvester embodying the present invention is indicated generally at 10 and includes a main frame having a front frame member 12, a rear frame member 14, a left side frame member 16, front and rear laterally offset right side frame members 18 and 20, an intermediate frame member 22 interconnecting the right side frame members, and a diagonal brace member 24 extending between the front and rear right side frame members 18 and 20.

The rear portion of the main frame is supported by wheels 26 journalled on the lower end of supports (not shown) which have their upper ends secured to the rear frame member 4 by clamp assemblies 28. The forward end of the main frame is supported by a forwardly extending hitch 30 which is adapted to be connected to a tractor drawbar (not shown).

A pair of support plates 32 and 34 depend from the left-hand and right-hand sides, respectively, of the main frame and each is spaced inwardly from its respective frame member. A plurality of digger wheel assemblies are secured to the front frame member 12 in spaced relation to each other and each includes a pair of lifter wheels 36 and an ejector paddle 38. The lifter wheels 36 are secured to the front frame member 12 and the ejector paddles 38 are mounted on a cross shaft 40 to be driven thereby. A first conveyor 42 is carried by the support plates 32 and 34 directly behind the digger wheel assemblies to receive beets from the digger wheel assemblies and convey them upwardly and rearwardly to a second cleaning conveyor 44 which extends transversely across the rear end of the first conveyor 42.

A vertical auger conveyor 46 is supported on the right-hand side of the main frame between the rear frame member 14 and the intermediate frame member 22, and includes an elongated cylindrical housing 48. The auger housing 48 is closed at both ends, but has a laterally directly opening 50 adjacent its lower end which opens toward one end of the second cleaning conveyor 44, as can best be seen in FIG. 3, and a rearwardly directly opening (not shown) adjacent its upper end for discharging the beets. The second cleaning conveyor 44 conveys the beets laterally to the right through the opening 50 and to the lower end of the vertical auger conveyor 46. The vertical auger conveyor conveys the beets upwardly through the rearwardly directed opening in auger housing 48 to a fourth conveyor (not shown) which moves the beets to a deposit area.

The ejector paddles 38, first conveyor 42, second cleaning conveyor 44, vertical auger conveyor 46, and fourth conveyor are all driven by a tractor through a main power shaft 52. For the full details of construction of the various components referred to and the manner in which they are driven, reference should be made to U.S. Pat. Nos. 3,695,360; 3,791,451; and 3,797,928.

FIG. 2 illustrates the second cleaning conveyor 44 and shows its position relative to the vertical auger conveyor 46. The conveyor 46 comprises a housing 48 surrounding a vertically extending auger having a core 54 and helical flighting 56. The second cleaning conveyor 44 comprises a plurality of transversely extending elongated rollers 57, 58 and 59 rotatably mounted in parallel relation on the main frame or separate support members adapted to be mounted on the main frame.

As shown in FIG. 2, when viewed from above, the vertical auger is rotated in a counter-clockwise direction. FIGS. 2 and 3 show the second cleaning conveyor 44 disposed such that the longitudinal centerline of the cleaning conveyor 44 is spaced rearward of the vertical axis of the auger core 54, relative to the direction of travel of the harvester 10. By arranging the relative positions of the second cleaning conveyor 44 and the vertical auger conveyor 46 in such a manner, a larger proportion of the beets moved by the cleaning conveyor 44 enter the vertical auger conveyor 46 tangentially of the vertical axis thereof at points where the peripheral edge of the auger flighting 56 is traveling to the right-hand side of the harvester 10; that is, the auger flighting 56 is traveling in the same direction as the beets entering the vertical auger conveyor 46. Such an arrangement thus, minimizes the tendency of the auger flighting 56 to repel the incoming beets. It has been found under actual harvest conditions, that spacing the cleaning conveyor 44 such that its centerline is disposed as little as 1½ inches rearwardly of the axis of the vertical auger conveyor 46, greatly facilitates the flow of beets from the cleaning conveyor 44 into the vertical auger conveyor 46 and eliminates the need for a flapper bar to force beets into the vertical auger conveyor 46.

If the vertical auger is rotated in a clockwise direction when viewed from above, spacing the second cleaning conveyor 44 such that the longitudinal centerline of the cleaning conveyor 44 is disposed forward of the axis of the auger core 54 would minimize the repelling force of the auger flighting 56. It is understood, therefore, that the direction of rotation of the vertical auger determines the optimum relative position of the second cleaning conveyor 44 to the vertical auger conveyor 46.

FIG. 2 shows the second cleaning conveyor 44 comprising two pairs of counter-rotating cleaning rollers having a helical ridge 60 and a center shaft 62. On the left-hand side, the central shafts 62 extend through and are journaled in support straps 64 and 65 which are attached to the left support plate 32. Sprockets 66 are attached to the portion of the central shafts 62 extending outwardly from the support straps 64 and 65; and the sprockets 66 are drivably engaged by a chain (not shown) which is entrained alternately under and over the sprockets 66 to produce counter rotation of adjacent rollers 57 and 58, and 58 and 59.

As most clearly shown in FIG. 5, the left end of the shafts of forwardmost roller 57 and rearwardmost roller 59 are rotatably mounted on rigid support straps 64 which are rigidly attached to the left support plate 32. The left ends of the shafts of intermediate rollers 58 are rotatably mounted on movable support straps 65 which are yieldably mounted on left support plate 32. Movable support straps 65, which support the intermediate rollers 58, are pivotally attached to the left support plate 32 by pin 68. Counter-opposing ears 70 extend normal to support straps 64 and 65, near the upper portion thereof, and have openings therein to receive studs 72. Springs 74 surround the portion of the studs 72 intermediate the ears 70; and nuts 76 threadably engage the ends of studs 72. The intermediate rollers 58 are thus, yieldably movable away from the adjacent forwardmost roller 57 and rearwardmost roller 59 to enlarge the spacing therebetween. The springs 74 act to force the intermediate rollers 58 back to a position where the spacing between the rollers 57, 58 and 59 is once again uniform.

The mounting of the right ends of the cleaning rollers is shown most clearly in FIGS. 2 and 3. Support sill 78 is attached to the main frame and extends below the cleaning conveyor 44 at its right-hand end. A support bracket 80 extends upward from the sill 78 and the central shafts 62 of the intermediate rollers 58 are journalled in the bracket 80 and rigidly supported thereby. The forwardmost roller 57 is yieldably connected to the main frame by a first yieldable mounting means 82 and the rearwardmost roller 59 is yieldable connected to the main frame by a second yieldable mounting means 84.

As most clearly shown in FIG. 2, the first yieldable mounting means 82 is attached to the main frame and supports the forwardmost roller 57. A horizontally disposed hollow cylinder 86 is attached intermediate its ends to brackets 88 which extends laterally from the front right side frame member 18. The forward end of the cylinder 86 has a flanged end 90 with openings therein. A U-shaped end member 92 having a flanged end 94 with openings corresponding to flanged end 90; and having an opening in the forwardmost end thereof is attached by bolts 96 which pass through the corresponding openings in flanged ends 90 and 94. Washers 98 surround bolts 96 intermediate the flanged ends 90 and 94 and provide a means of adjusting the spacing between the flanged end 90 and 94. The hollow cylinder 86 and the end member 92 are thus rigidly attached to the main frame and extend horizontally forward of the forwardmost roller 57.

A yoke 100 is rotatably attached to the central shaft 62 of the forwardmost roller 57 near its right-hand end. A cylindrical rod 102, having a diameter less than the inside diameter of the hollow cylinder 86, is attached at one end of the yoke 100 and is adapted to slideably engage the interior of the hollow cylinder 86. The rod 102 extends beyond the forward flanged end 90 of cylinder 86; and a threaded shaft 104 extends from the forward end of rod 102 through the opening of the forwardmost end of end member 92. A nut 106 threadably engages the free end of threaded shaft 104; and contact of the nut 106 and the end member 92 limits the rearward movement of the first yieldable mounting means 82. A coil tension spring 108 surrounds the threaded shaft 104 and has one end in contact with the forward end of rod 102. A sleeve 110 surrounds the threaded shaft 104 forwardly of the coil spring 108 and has one end in contact with the coil spring 108 and the opposite end in contact with the end member 92. The distance of forward movement of the first yieldable mounting means 82 is therefore limited to the difference in length of the coil spring 108 when extended and when fully compressed.

The first yieldable mounting means 82 provides a support for the forwardmost roller 57 wherein the structure is disposed forward of the forwardmost roller 57; with dirt and debris falling through the spaces between the rollers 57 and 58 falls freely to the ground.

As most clearly shown in FIGS. 2 and 4, the second yieldable mounting means 84 is attached to the main frame and supports the rearwardmost roller 59. A vertical support member 112 is attached to rear frame member 14 by a clamping member 114 and extends downwardly therefrom. A horizontal support member 116 is rigidly attached at one end thereof to the lower portion of vertical support member 112 and has a forwardly extending free end. A tab 118 having an opening therein extends from the vertical support member 112 below the horizontal support member 116 and normal thereto.

A strap member 120 is rotatably attached to the central shaft 62 of the rearwardmost roller 59 near its right-hand end. The strap member 120 extends downwardly and rearwardly from the rearwardmost roller 59 and is pivotally attached to the horizontal support member 116 by pivot pin 122. A connecting rod 124 is pivotally attached at one end thereof to the strap member 120 below the horizontal support member 116 by pin 126. The opposite end of connecting rod 124 has a threaded portion which passes through the opening in tab 118 and extends rearwardly thereof. A coil tension spring 128 surrounds the threaded portion of the connecting rod 124 and is held in place by washer 130 and nut 132. A stop plate 134 is attached to horizontal support member 116 by bolt 136. The stop plate 134 is attached rearwardly adjacent to the strap member 120 and has a beveled edge 138. The rearward movement of the rearwardmost roller 59 is thus limited by the stop plate 134 as the roller 59 pivots about the pivot pin 122 and the edge of strap member 120 contacts the beveled edge 138. The forward movement of the rearwardmost roller 59 is, likewise, limited by contact of the edge of the strap member 120 with the adjacent straight edge of the stop plate 134.

The second yieldable mounting means 84 provides a support for the rearwardmost roller 59 wherein the structure is disposed downwardly and rearwardly from the rearwardmost roller 59. Dirt and debris falling through the spaces between the rollers 58 and 59 will, thus, fall freely to the ground.

In operation the second cleaning conveyor 44 of the present invention provides resiliently yieldable mounting means at the right-hand side of the forwardmost and rearwardmost cleaning rollers 57 and 59; and provides a structure which eliminates the buildup of dirt and debris above the level of the cleaning rollers 57, 58, and 59. Looking from the left-hand side, as in FIG. 5, the forwardmost roller 57 rotates in a clockwise direction and the adjacent intermediate roller 58 rotates in a counterclockwise direction. Small rocks 140 that approach the right-hand end of the second cleaning conveyor 44 are forced down between these rollers 57 and 58. As the rock 140 passes downward it exerts a force tending to separate the rollers 57 and 58. This force is transmitted through the first yieldable mounting means 82 and results in the compression of coil spring 108 and the horizontal forward movement of forwardmost roller 57. After the rock passes through the enlarged space between the rollers 57 and 58, the coil spring 108 expands to its original length and returns the forwardmost roller 57 to its original position. In like manner, rocks 140 passing downward between the rearwardmost roller 59 and the next adjacent intermediate roller 58 exerts forces tending to separate the rollers 58 and 59. This force results in the compression of coil spring 128 and the generally horizontal rearward movement of the rearwardmost roller 59. After the rock 140 has passed through the enlarged space between the rollers the coil spring 128 expands and returns the rearwardmost roller 59 to its original position.

Obviously many modifications and variations of the present invention are possible in light of the above teachings. It is therefore to be understood that, within the scope of the appended claims, the invention may be practiced otherwise than as specifically described.

I claim:

1. A root crop harvester including a main frame having transversely extending front and rear frame members; wheel means secured to and supporting the rear of the main frame; hitch means secured to a forward portion of the main frame and adapted to be connected to a propelling tractor for at least partially supporting the front of the main frame; root digging means secured to and depending from the front frame member; first conveyor means supported from the main frame behind the root digging means for receiving roots therefrom and moving the same upwardly and rearwardly; second conveyor means including a plurality of transversely extending elongated rollers rotatably mounted on the frame in parallel relation for receiving roots from the first conveyor means and moving the same laterally; a vertical auger conveyor mounted on the frame and including a rotatable auger disposed at one end of the second conveyor means for receiving roots therefrom and elevating the roots for discharge purposes, and drive means for the first conveyor means, second conveyor means, and vertical auger conveyor said drive means being supported on the main frame and including a main drive shaft extending generally forwardly along the hitch means for connection with the tractor; wherein the improvement comprises:

first resiliently yieldable mounting means attached to the main frame and supporting the forwardmost roller at the vertical auger conveyor end, said first mounting means disposed forward of said forwardmost roller toward the hitch means, wherein said first resiliently yieldable mounting means includes:
a hollow cylinder attached intermediate the ends thereof to said frame and disposed forward to said forwardmost roller;
an end member attached at one end to the forwardmost end of said cylinder and having an opening in the opposite end thereof;
a yoke rotatably attached to said forwardmost roller;
a rod attached at one end to said yoke and adapted to slideably engage the interior of said hollow cylinder;
a threaded shaft attached at one end to the opposite end of said rod and having the opposite end thereof extending through the opening in said end member;
a coil tension spring surrounding said threaded shaft and disposed such that one end is in contact with said opposite end of said rod;
a sleeve member surrounding said threaded shaft and disposed such that one end contacts said end member and the opposite end thereof contacts the opposite end of said spring; and
a nut threadably engaging said opposite end of said threaded shaft extending exterior of said end member; and
second resiliently yieldable mounting means attached to the main frame and supporting the rearwardmost rollers at the vertical auger conveyor end, said second mounting means disposed rearward of said rearwardmost roller away from the hitch means.

2. The root crop harvester of claim 1 wherein the improvement further comprises:
said second conveyor means disposed such that the longitudinal centerline of said second conveyor means is spaced rearward of the axis of said vertical auger conveyor relative to the normal direction of travel of the harvester, when the auger is rotated in a counterclockwise direction as viewed in plan.

3. The root crop harvester of claim 1 wherein said second resiliently yieldable mounting means comprises:
a vertical support member rigidly attached at one end to the rear of said main frame and extending downwardly therefrom;
a horizontal support member rigidly attached at one end to the lower portion of said vertical support member and having a forwardly extending free end;
a tab member rigidly attached to the vertical support member below the horizontal support member, said tab having an opening therethrough;
a strap member rotatably attached at one end to said rearwardmost roller and extending downwardly and rearwardly therefrom, and pivotally attached intermediate the ends thereof to said horizontal support member;
a connecting rod pivotally attached at one end to the opposite end of said strap member and having the opposite end thereof extending through the opening in said tab member;
a coil tension spring surrounding the opposite end of said connecting rod and having one end thereof in contact with said tab member;
a nut threadably engaging the opposite end of said connecting rod and contacting the opposite end of said spring; and
a stop plate attached to said horizontal support member rearward of said strap member.

* * * * *